(12) United States Patent
Boutigny et al.

(10) Patent No.: US 11,750,304 B2
(45) Date of Patent: Sep. 5, 2023

(54) METHOD FOR CALIBRATING A KA BAND SATCOM ANTENNA

(71) Applicant: THALES, Courbevoie (FR)

(72) Inventors: Pierre-Henri Boutigny, Gennevilliers (FR); Frédéric Magdelaine, Gennevilliers (FR)

(73) Assignee: THALES, Courbevoie (FR)

( * ) Notice: Subject to any disclaimer, the term of this patent is extended or adjusted under 35 U.S.C. 154(b) by 435 days.

(21) Appl. No.: 17/253,094

(22) PCT Filed: Jun. 21, 2019

(86) PCT No.: PCT/EP2019/066488
§ 371 (c)(1),
(2) Date: Dec. 16, 2020

(87) PCT Pub. No.: WO2019/243584
PCT Pub. Date: Dec. 26, 2019

(65) Prior Publication Data
US 2021/0281331 A1 Sep. 9, 2021

(30) Foreign Application Priority Data
Jun. 22, 2018 (FR) ........................ 1800655

(51) Int. Cl.
*H04B 17/12* (2015.01)
*H04B 17/21* (2015.01)
*H01Q 1/42* (2006.01)

(52) U.S. Cl.
CPC ............. *H04B 17/12* (2015.01); *H04B 17/21* (2015.01); *H01Q 1/421* (2013.01)

(58) Field of Classification Search
CPC ................................. H04B 17/12; H04L 12/28
USPC ................................. 370/329, 403, 405, 395
See application file for complete search history.

(56) References Cited

U.S. PATENT DOCUMENTS 6,646,598 B1  11/2003  Timothy et al.
7,199,764 B2 *  4/2007  Tietjen .................. G01S 13/426
                                                343/882
2015/0200449 A1  7/2015  Sleight et al.

* cited by examiner

*Primary Examiner* — Dang T Ton
(74) *Attorney, Agent, or Firm* — BakerHostetler

(57) ABSTRACT

Method and device for calibrating an antenna includes the following steps: define a number n of positions of angles for the aircraft situated in a calibration zone: measure the value of the orientation of the antenna for each position n, [#a(n), #a(n)]; define the theoretical orientation of the antenna [#a(n)*, #a(n)*] by taking account of the pitch value, of the roll value, of the yaw value (heading) for the aircraft for each position n, and of the orientation values of the satellite [#r(n), #r(n)]: [Aa(n)*, Ea(n)*]=F(H(n), P(n), R(n), ##, ##, #R, ##, Ar(n), Er(n)), where F is a chosen geometric function; define a criterion C: C=#(#a(n)−#a(n)*)²+(#a(n)−#a(n)*)²; minimize the value of the criterion C so as to determine the bias values (##, ##, #R, ##) from the values [Aa*(n), Ea*(n)] and use the said bias values to minimize the disparities between the measured angles and the theoretical angles.

6 Claims, 1 Drawing Sheet

METHOD FOR CALIBRATING A KA BAND SATCOM ANTENNA

CROSS-REFERENCE TO RELATED APPLICATIONS

This application is a National Stage of International patent application PCT/EP2019/066488, filed on Jun. 21, 2019, which claims priority to foreign French patent application No. FR 1800655, filed on Jun. 22, 2018, the disclosures of which are incorporated by reference in their entirety.

FIELD OF THE INVENTION

The invention relates to a method for calibrating a Ka-band Satcom antenna used notably in the aeronautical field.

It is applied in any aeronautical application or in other fields offering Internet access to a user present in a moving vehicle.

BACKGROUND

Providing Internet access on airliners is an emerging field that uses satellites as well as a directional antenna installed on the cabin of an aircraft. For this application, the bandwidth requirements are significant, which is why the Ka band is widely used. This Ka band (20 GHz in reception mode and 30 GHz in transmission mode) is relatively free, unlike the Ku band (~12 GHz), which is widely used for television broadcasting.

The use of this frequency band poses technical problems when installing and pointing the directional antenna. Specifically, these antennas have relatively large sizes and a rectangular "low-profile" geometry. The large dimension of the antenna may reach 70 cm.

At a frequency of 30 GHz, such an antenna should be pointed at the satellite with an accuracy better than 0.2°, otherwise the loss of gain is relatively prohibitive.

Antenna pointing uses data from the inertial units of the aircraft, and it is possible to achieve an antenna pointing accuracy of 0.1° with laser interferometry navigation equipment. However, the installation of the antenna on the cabin is far less accurate, and it is not possible to achieve accuracy better than one degree between the reference frames of the inertial units and the antenna support, which is often located several meters behind the airfoil. This value of the order of one degree has to be measured in order to be able to be compensated.

The prior art describes calibration methods that use optical means, laser interferometry or the like, to calibrate the direction of the antenna.

SUMMARY OF THE INVENTION

The subject matter of the invention relates to a process or a method that makes it possible to measure the installation bias of the antenna automatically and with greater accuracy than that afforded by the techniques implemented in the prior art. In a novel approach, the method uses the reception of the satellite signal obtained for a plurality of orientations of the aircraft on the ground during the calibration phase. When the measurements are obtained, a calculation is performed that makes it possible to obtain bias data regarding the antenna support.

The invention relates to a method for calibrating an antenna positioned on an aircraft, said antenna being protected by a radome and operating in a band adapted for providing Internet communication to a user via a satellite, characterized in that it comprises at least the following steps:

Defining a number n of angle positions for the aircraft located in a calibration region, where n is greater than one,
Measuring the value of the orientation of the antenna for each position n,
[Aa(n), Ea(n)], where Aa(n), Ea(n) correspond to the azimuth and the elevation of the antenna for a position n,
Defining the theoretical orientation of the antenna [Aa(n)*, Ea(n)*] taking into account the pitch value, the roll value and the heading value for the aircraft, for each position n, and the satellite orientation values [Ar(n), Er(n)]:
[Aa(n)*, Ea(n)*]=F(H(n), P(n), R(n), δH, δH, δR, δE, Ar(n), Er(n)), where F is a chosen geometric function,
where Ar(n), Er(n) are the coordinates of said satellite,
Defining a criterion C:

$$C=\Sigma(Aa(n)-Aa(n)^*)^2+(Ea(n)-Ea(n)^*)^2$$

Minimizing the value of the criterion C in order to determine the bias values (δH, δP, δR, δE) from the values [Aa*(n), Ea*(n)] and using said bias values to minimize the differences between the measured angles and the theoretical angles.

According to one embodiment, the method uses eight measurement angles, for each orientation of the antenna, and searches for the maximum signal from the satellite received on the antenna, and when this maximum is found, the following values are stored:
H(n), P(n), R(n),
[Ar(n), Er(n)]
[Aa(n), Ea(n)],
the method then uses an optimization method to minimize the value C and calculate the bias values (δH, δP, δR, δE) that will be used for pointing the antenna.

The criterion C is minimized to achieve the value zero.

The method is used for example to calibrate an antenna configured so as to operate on an aircraft and in the Ka band.

The invention also relates to a device for calibrating an antenna positioned on an aircraft and operating in a band adapted for providing Internet communication to a user via a satellite, characterized in that it comprises a processor configured so as to execute the steps of the method according to the invention.

The device is used notably to calibrate an antenna operating in the Ka band in order to provide an Internet-type link for users of the aircraft.

BRIEF DESCRIPTION OF THE DRAWINGS

Other features and advantages of the present invention will become more clearly apparent on reading the description of exemplary embodiments alongside the figures, in which.

DETAILED DESCRIPTION

Figure 1:
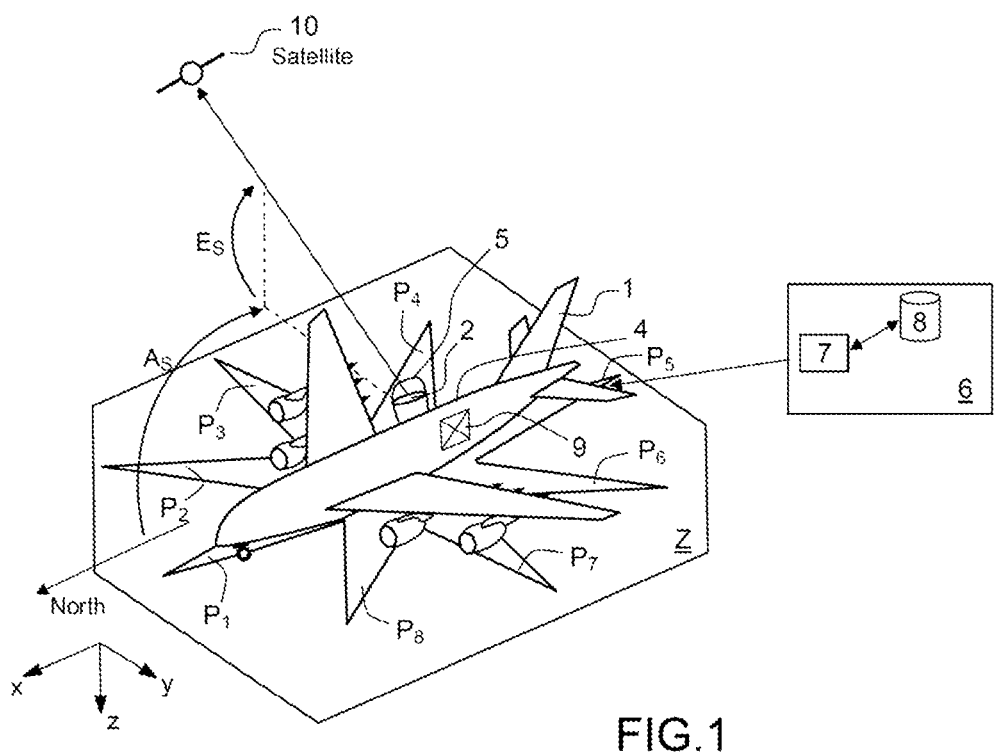
FIG. 1 shows a diagram of an aircraft positioned in a calibration region.

FIG. 1 shows an aircraft 1 equipped with an antenna 2 mounted, via an antenna support 3, on the cabin 4 of the aircraft and protected by a radome 5. The antenna is chosen so as to provide Internet communication when the aircraft is in flight or on the ground before the take-off phase, for example via the use of a satellite 10.

The antenna is connected to a calibration device 6 that may be positioned in the aircraft, which comprises notably a processor 7 that will execute the steps of the method according to the invention, a memory 8 making it possible to store the tables used during the method and the results of the bias values for possible future uses. The aircraft also comprises an inertial unit 9 configured so as to transmit information to the processor.

To implement the method according to the invention, the aircraft is placed in a region Z that makes it possible for example to perform eight rotations of approximately 45°, P1 to P8, (for example the calibration region of magnetic compasses).

The installation bias of the antenna may be described by four angular values (δH, δH, δR, δE), the first three corresponding to the relative orientation of the antenna support with respect to the navigation reference of the aircraft, heading, pitch, roll, further known by their abbreviations (Heading H, Pitch P, Roll R), and the fourth E corresponding to the offset from the elevation axis of the antenna.

In the calibration region Z, the satellite 10 that is used is seen from the angles (As, Es), which correspond to its local azimuth and elevation, and the orientation of the aircraft is given by the three values (H, P, R: Heading, Pitch, Roll) delivered by the inertial unit.

When the antenna 2 is pointed at the satellite 10 (the pointing position is for example detected by the maximum reception of a signal), the orientation of the antenna in relation to its support is described by the two angles (Aa, Ea), which correspond to the azimuth and the elevation of the antenna (not shown for the sake of simplification).

The antenna is generally protected by a radome 5, which introduces refraction of the satellite signal. This refraction value is contained in a table provided by the radome manufacturer. This table gives the refraction of the antenna wave as a function of its azimuth and elevation. The satellite seen through the radome thus has the following angular coordinates:

In azimuth: $Ar = As + Ta(Aa)$

In elevation: $Er = Es + Te(Ea)$

T (Ta, Te) being the refraction table of the radome tabulated in azimuth and elevation.

When the maximum reception $S_{max}$ of the satellite signal has been detected at the antenna, the orientation of the antenna may be expressed as follows:

$$[Aa^*, Ea^*] = F(H, P, R, \delta H, \delta H, \delta R, \delta E, Ar, Er)$$

F is a purely geometric function that makes it possible to calculate the theoretical orientation of the antenna [Aa*, Ea*] from changes in mathematical reference frames. This function is conventional in the field of satellite communications and will not be described.

Considering an aeronautical reference frame with the z axis going downward:

Rx; Ry; Rz, a rotation matrix about the x, y, z axes,
R; P; H, data from the navigation unit (aircraft orientation),
Ar and Er, the local orientation of the satellite corrected for radome refraction,
Aa and Ea, the azimuth and the elevation of the antenna,
(δH, δP, δR, δE) the unknown values to be found,
the relationship between the various parameters is expressed in the form of a vector:

$$V = \begin{pmatrix} Vx \\ Vy \\ Vz \end{pmatrix} = Rx(-\delta R) * Ry(-\delta P) *$$

$$Rz(-\delta H) * Rx(-R) * Ry(-P) * Rz(-H) * Rz(Ar) * Ry(Er) * \begin{pmatrix} 1 \\ 0 \\ 0 \end{pmatrix}$$

$$Aa *= \text{Atan}\left(\frac{Vy}{Vx}\right)$$

$$Ea *= \text{Atan}\left(\frac{-Vz}{\sqrt{Vx^2 + Vy^2}}\right)$$

Since the value of the biases is unknown, the theoretical orientation [Aa*, Ea*] cannot be calculated; on the other hand, it is possible to obtain a close value [Aa, Ea] through measurement, for example by searching for the maximum signal of the SNR signal received on the antenna.

The method according to the invention making it possible to calculate the biases consists in multiplying the measurements of the two angles [Aa, Ea] and then in using an optimization method known to a person skilled in the art, which will make it possible to find the best bias that minimizes a certain criterion.

If the measurements are indexed by an index n, this gives: [Aa(n)*, Ea(n)*]=F(H(n, P(n), R(n), δH, δP, δR, δE, Ar(n), Er(n), for the measurement n, and
the following is taken as criterion to optimize:

$$C = \Sigma(Aa(n) - Aa(n)^*)^2 + (Ea(n) - Ea(n)^*)^2$$

When the value of C is minimal, the corresponding bias makes it possible to minimize the difference between the measured values of the two angles (Aa, Ea) that correspond to the antenna azimuth and elevation and the calculated values.

Figure 2:
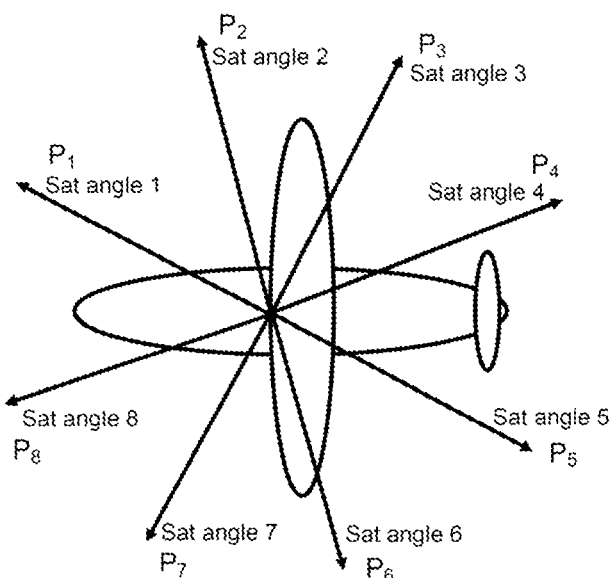
FIG. 2 shows an example of a plurality of positions of the aircraft chosen for the calibration.

The method according to the invention is for example implemented in the form of software at the processor. According to one example illustrated in FIG. 2, the method determines eight measurement angles while avoiding pointing at the tail of the aircraft in order to avoid the signal being blocked.

For each orientation (fixed angle, for each value of n), the software performs a scan in order to search for the maximum signal from the satellite $S_{max}$, and when this maximum is found, the following values are stored, for each value of n: H(n), P(n), R(n),
Er(n), Ar(n), the local orientation of the satellite corrected for radome refraction,
Ea(n), Aa(n), the azimuth and the elevation of the antenna.

When the eight measurements have been performed, the software uses an optimization method to minimize the value of C. When this minimum is obtained, the software displays the bias values (δH, δP, δR, δE) to be used for pointing the antenna. The optimization method is known to a person skilled in the art and will not be described.

The value of C is displayed for example on a display device connected to the processor, and since it corresponds to a quality indicator, it is necessary to achieve a value close to zero.

The bias values are stored in a file that is used locally by the antenna controller, and are also transmitted to a general installation database in order to be able to be reused during maintenance operations.

The method according to the invention offers an accurate calibration method.

The invention claimed is:

1. A method for calibrating an antenna positioned on an aircraft, said antenna being protected by a radome and operating in a band suitable for providing internet communication to a user via a satellite, comprising at least the following steps:

defining a number n of angle positions for the aircraft located in a calibration region, where n is greater than one, measuring the value of the orientation of the antenna for each position n, [Aa(n), Ea(n)], where Aa(n), Ea(n) correspond to the azimuth and the elevation of the antenna for a position n, defining the theoretical orientation of the antenna [Aa(n)*, Ea(n)*] taking into account the pitch value, the roll value and the heading value for the aircraft for each position n, and the satellite orientation values [Ar(n), Er(n)]:

[Aa(n)*, Ea(n)*]=F(H(n), P(n), R(n), δH, δP, δR, δE, Ar(n), Er(n)), where F is a chosen geometric function, where Ar(n), Er(n) are the coordinates of said satellite defining a criterion C:

$$C=\Sigma(Aa(n)-Aa(n)^*)^2+(Ea(n)-Ea(n)^*)^2$$

minimizing the value of the criterion C in order to determine the bias values (δH, δP, δR, δE) from the values [Aa*(n), Ea*(n)] and using said bias values to minimize the differences between the measured angles and the theoretical angles.

2. The method as claimed in claim 1, wherein eight measurement angles are determined, for each orientation of the antenna, and the maximum signal from the satellite received on the antenna is sought, and when this maximum is found, the following values are stored:

H(n), P(n), R(n),
[Ar(n), Er(n)]
[Aa(n), Ea(n)]

an optimization method is used to minimize the value C and calculate the bias values (δH, δP, δR, δE) to be used for pointing the antenna.

3. The method as claimed in claim 1, wherein the criterion C is minimized to achieve the value zero.

4. The method as claimed in claim 1, wherein an antenna configured so as to operate on an aircraft and in the Ka band is calibrated.

5. A device for calibrating an antenna positioned on an aircraft and operating in a band suitable for providing internet communication to a user via a satellite, comprising a processor configured so as to execute the steps of the method as claimed in claim 1.

6. The calibration device as claimed in claim 5 for an antenna operating in the Ka band.

* * * * *